United States Patent
Wunder et al.

[15] 3,676,987
[45] July 18, 1972

[54] WATER SEPARATOR

[72] Inventors: John E. Wunder, Dayton; Anson S. Coolidge, Centerville, both of Ohio

[73] Assignee: United Aircraft Products, Inc., Dayton, Ohio

[22] Filed: July 27, 1970

[21] Appl. No.: 58,279

[52] U.S. Cl. ............................. 55/459, 55/512, 55/DIG. 25
[51] Int. Cl. ........................................................ B04c 5/04
[58] Field of Search .................. 55/337, 320, 459, 512, 238, 55/457, DIG. 25; 122/488

[56] References Cited

UNITED STATES PATENTS

| | | | |
|---|---|---|---|
| 2,594,490 | 4/1952 | Patterson | 122/488 |
| 2,812,034 | 11/1957 | McKelvey, Jr. | 55/DIG. 25 |
| 3,093,468 | 6/1963 | Krochta | 55/238 |
| 3,199,270 | 8/1965 | Oehlrich | 55/456 |
| 3,408,828 | 11/1968 | Soumerai et al. | 55/320 |
| 3,421,315 | 1/1969 | Aoi | 55/337 |
| 3,490,209 | 1/1970 | Fernandes et al. | 55/457 |
| 3,566,584 | 2/1971 | Ruthrof et al. | 55/460 |

*Primary Examiner*—Bernard Nozick
*Attorney*—J. E. Beringer

[57] ABSTRACT

Apparatus including a generally cylindrical housing for interposing in a flowing stream of gaseous fluid. Within the housing, a portion of the inflowing gaseous fluid stream is subjected to hydrocyclonic action and separated liquid is discharged through one end of the housing. Another portion of the inflowing stream is subjected to circuitous flow within the housing and in a portion of the circuitous path is a coalescing means. Inherently separated liquid from the other portion moves to a collection chamber and discharges through a liquid outlet at the other end of the housing.

8 Claims, 3 Drawing Figures

PATENTED JUL 18 1972
3,676,987
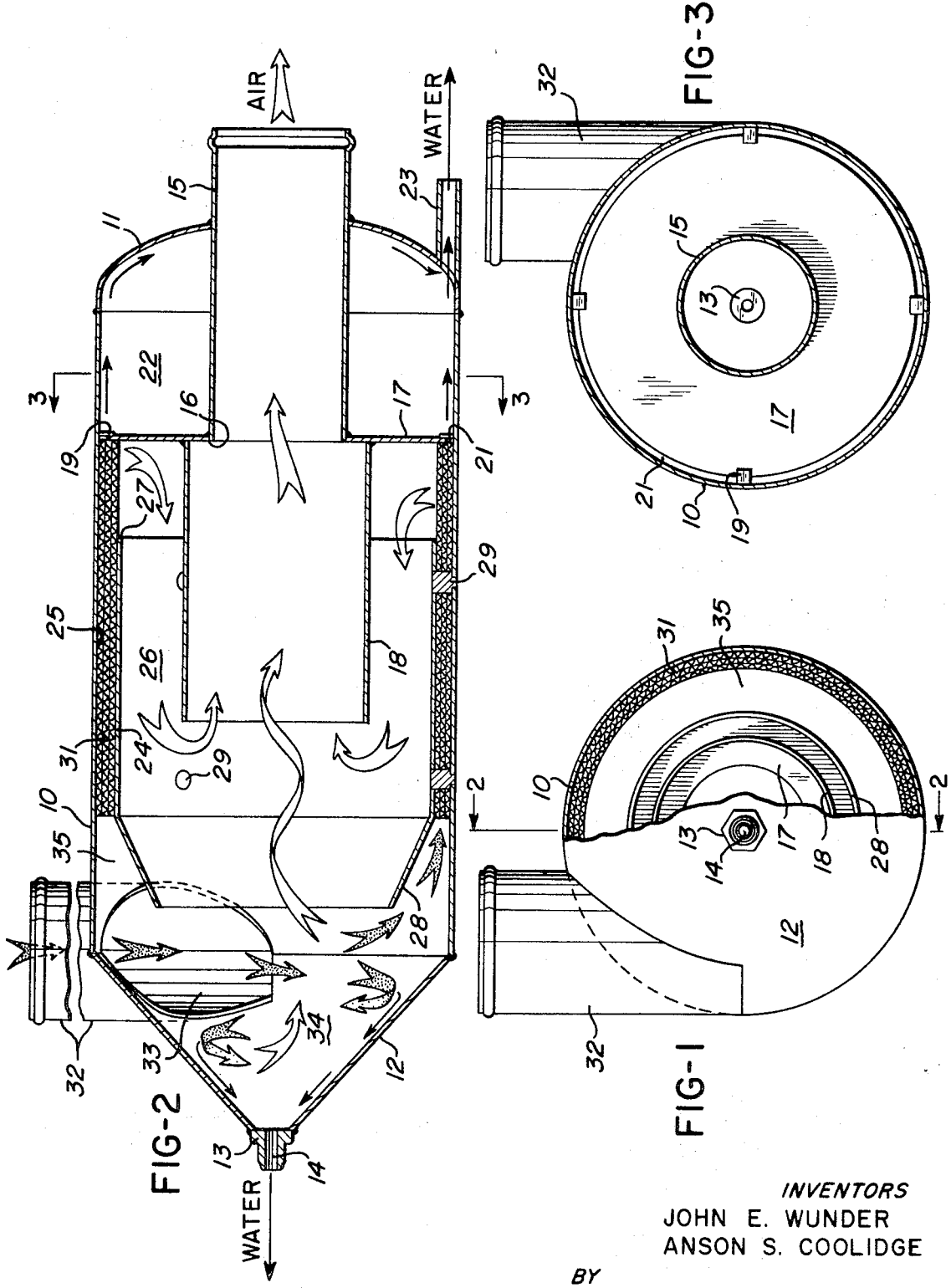
INVENTORS
JOHN E. WUNDER
ANSON S. COOLIDGE
BY
*J.E.Beringer*
THEIR ATTORNEY

WATER SEPARATOR

BACKGROUND OF THE INVENTION

This invention relates to water separators, and particularly to devices for separating and removing water or other liquid from a flowing stream of gaseous fluid.

Although not so limited, the invention has special reference to systems utilizing "bleed air," that is, air which has been drawn from ambient sources, compressed in a gas turbine engine or the like and made available for environmental control and like purposes. Moisture becomes a problem in such systems, especially when the air is to be cooled before use as by passing through a heat exchanger, and more particularly when the air after passing through the heat exchanger is released through the turbine of an air cycle machine or the like for further cooling. In the heat exchanger water is condensed out of the flowing air upon the heat transfer surface and rejoins the flowing air stream as entrained droplets of relatively large size. Humid day operation will find significant amounts of water so condensed. As the air stream is released through the turbine of an air cycle machine, entrained water becomes a source of damage to turbine blades due to erosion and imbalance effects. It is desirable to avoid such damage by removing substantial amounts of water from the air stream after passage through the heat exchanger and before entry into the air cycle machine.

Water separators are known in the prior art but these are constructed to deal with a fog-like atmosphere. The degree of success enjoyed usually depends upon the size and complication of the device as well as upon permitted pressure drop. Moreover, for maximum performance such devices usually force all air flow through a coalescer screen and due to icing problems this necessitates incorporation of a by-pass valve.

SUMMARY OF THE INVENTION

According to the present invention, a water separator operates with a high degree of success in water removal and at the same time is relatively simple in construction and small in size. The use of a bypass is obviated since the device inherently separates and removes large amounts of moisture from a flowing fluid stream irrespective of coalescer icing. Required pressure drop is relatively small. According to a feature of the invention, a water separator provides two water outlets and embodies individual means for separating out entrained water and supplying the outlets. The combination effect yields a cumulative result substantially superior to conventional single outlet devices.

To provide a water separator characterized in these and other respects to be made more clear hereinafter is an object of the invention.

Another object of the invention is to provide a water separator or eliminator of particular utility in a system in which compressed air is in successive steps cooled in a heat exchanger and released through turbine means.

Other objects and structural details of the invention will appear from the following description, when read in conjunction with the accompanying drawings, wherein:

FIG. 1 is an end view, partly broken away, of a water separator in accordance with the illustrated form of the invention;

FIG. 2 is a view in longitudinal section, taken substantially along the line 2—2 of FIG. 1; and FIG. 3 is a view in cross section, taken substantially along the line 3—3 of FIG. 2.

Referring to the drawings, a water separator in accordance with the illustrated embodiment of the invention comprises a cylindrical housing 10, to one end of which is fixed an end bell or closure cap 11. Fixed to the opposite end of the housing 10 is a cone shaped closure member 12, the apex of which is in a relatively projected relation to the housing and aligned in the housing axis. A fitting 13 having a small diameter bore 14 is installed in the apex of conical member 12. A relatively large diameter tube 15 is installed in to project to either side of end closure 11, in the housing axis. At its inner end, the tube 15 terminates in a central opening 16 in a plate 17 disposing perpendicularly of the housing axis. The tube 15 projects to one side of plate 17 to and through the end closure 11. An extension 18 of the tube 15 is secured to and projects from the opposite side of plate 17 a substantial distance within housing 10, also in the housing axis. Tube 15 and extension 18 are open at their ends and constitute a through, open flow path from the interior of the housing to the exterior thereof through end closure 11.

Perpendicular plate 17 has a diameter somewhat less than the inside diameter of housing 10, the space between the plate's periphery and the housing being bridged by a circumferential series of spacers 19 fixing the plate 17 relatively to the housing and defining flow apertures 21 around the plate's periphery. The perpendicular plate 17 and end closure 11 define between them a water collection chamber 22. A small tube 23 installed in end closure 11 provides an outlet from the water collection chamber.

In surrounding, concentric relation to the tube extension 18 is a cylindrical baffle member 24 defining with housing 10 an outer annular chamber 25 and defining with tube extension 18 an inner annular chamber 26. The cylindrical baffle 24 is spaced longitudinally from the perpendicularly disposing baffle 17 and provides therewith a circular opening 27 which is adjacent to plate 17 and relatively remote from what may be considered the inner end of extension 18. In the latter connection, it will be understood that tube segments 15 and 18 form in effect a single tube and could be made in one piece if desired. The cylindrical baffle 24 projects substantially beyond the inner end of tube extension 18 and its extremity is tapered to form a nose portion 28. The cylindrical baffle is fixed in position within the housing by a circumferential series of installed studs 29. In the outer annular chamber 25 is coalescing means 31 in the form of multiple layers of screening material. It is annular, cartridge-like in form to fit in chamber 25 and substantially fills such chamber from the base of nose portion 25 to perpendicularly disposing plate 17.

The tube 15 and its inner extension 18 form a gas outlet. The fitting 13 and the tube 23 define individual water outlets. In installing the water separator in a system flowing a stream of gaseous fluid, a boss 32 is connected to receive such flowing stream. The boss 32 opens through the shell of housing 10 by way of an opening 33 and is positioned in such offset relation to the axis of the housing as to cause inflowing fluid to achieve a tangential relation to the interior of the housing wall. The inlet 33 is located in a substantially bi-secting relation to the base of conical end member 12 and in a partly overlapping relation to nose portion 28 of the cylindrical baffle 24. As the flowing stream enters the housing, a part thereof is immediately received upon the interior surface of conical end member 12 and begins a helical travel thereon toward the outer or apex end thereof. Conical member 12 defines internally thereof a separation chamber 34. With respect to the part of the inflowing fluid stream reaching chamber 34, a hydrocyclonic separation action ensues. A heavier fraction, as represented by water particles, is forced to the wall of the chamber and progresses therealong to fitting 13 where it discharges from the separator by way of bore 14. A lighter fraction, comprising the gas or air moves to the center of the separating chamber and in a reverse motion travels axially toward and into the inner end of gas inlet tube extension 18 where it is allowed to continue to flow axially to and through tube 15. The outer end of tube 15 is suitably formed for attachment of the separator in the system whereby the de-moisturized gas may continue on to a place of use.

The part of the inflowing fluid stream not subjected to a hydrocyclonic action in separation chamber 34 is trapped by nose portion 28 in a surrounding annular chamber 35. From there it is forced longitudinally into outer annular chamber 25 and into contact with coalescing means 31 therein. The screening comprising coalescing means 31 tends to intercept fine moisture particles and in a principle of agglomeration forms relatively large water droplets. These are blown longitudinally through the chamber 25 and to and through aperture passages 21 at the periphery of perpendicularly disposing baffle 17 to be received in water collection chamber 22. The air or gas flowing through chamber 25 now relatively free of entrained water is deflected by the plate 17 to flow through opening 27 into annular chamber 26. There it reverses direction and flows along tube extension 18 to the inner end thereof where it turns and joins the inner helix of air coming from the separation chamber in moving to and through the gas outlet. Collected water in chamber 22 is drained off by outlet 23.

The air entering the separator contains substantial amounts of entrained water, which while in the main in large droplet form may contain fine moisture particles as well. Larger droplets are blown directly through the screen means 31 into chamber 22. Fine particles have their passage slowed down in the screen means and come together to form new droplets which exit, like the others, through aperture passages 21 into chamber 22.

The device is in the main constructed of relatively inexpensive sheet metal parts suitably secured together, as by welding in the manner indicated. The involved pressure drop is relatively low, only that portion of the flowing stream trapped in chamber 35 being required to pass through coalescing means and to have a circuitous travel within the housing. The screening comprising the coalescing means offers but slight resistance to flow, however, and only two turns of the flowing gas are required to reach gas outlet tube 18. By-pass valve means is not required. Should coalescer means 31 become blocked as a result of icing, all flow can be accommodated directly into cylindrical baffle 24 to gas outlet tube 18. Moreover, substantial amounts of entrained water will continue to be removed by the continuous hydrocyclonic action taking place in separation chamber 34.

The separator device has been disclosed in a preferred physical form. It will be evident, however, that structural changes and modifications are entirely possible without departing from expressed inventive concepts.

What is claimed is:

1. Apparatus for separating and removing liquid from a flowing stream of gaseous fluid, including a generally closed cylindrical housing having a liquid outlet at each end thereof, laterally disposing inlet means intermediate the ends of the housing for admitting the flowing stream of gaseous fluid thereto, said inlet means disposing to introduce the flowing stream tangentially of the internal wall of the housing, said internal wall forming a conical separation chamber between said inlet means and one end of the housing, the apex of said separation chamber being open and forming the liquid outlet at said one end of the housing, a gas outlet tube having an inner end terminating within said housing opposite the liquid outlet in said one end and extending at its other end to and through the other end of said housing, said inlet means disposing in substantially bisecting relation to the base end of said separation chamber whereby a part of the inflowing stream of gaseous fluid enters into said separation chamber for helical flow therethrough with liquid separating therefrom and discharging through the liquid outlet in the apex of said chamber while the gas in said part establishes a flow path in a reverse direction to and through the inner end of said gas outlet tube, means including a cylindrical baffle intermediate said internal wall and said gas outlet tube for directing the remaining part of the stream of gaseous fluid circuitously to the inlet end of said gas outlet tube, and means for separating out liquid in said remaining part and discharging it toward the said other end of said housing for exit through the liquid outlet located therein.

2. Apparatus according to claim 1, wherein said separation chamber and said gas outlet tube are in longitudinally spaced, aligned relation in the axis of said housing, the liquid outlet in said other end of the housing being offset from said axis.

3. Apparatus according to claim 2, wherein the means for separating out liquid in said remaining part of the flowing stream includes a baffle disposing perpendicularly of the housing axis in surrounding sealed relation to said gas outlet tube and forming with said other end of the housing a liquid collection chamber with which the liquid outlet at said other end of the housing communicates, said last named means further including a cylindrical baffle concentric to the housing axis defining with said housing an outer annular chamber and with said gas outlet tube an inner annular chamber, the latter communicating with the inner end of said gas outlet tube, said cylindrical baffle providing means intercommunicating said annular chambers at a location relatively remote from the inner end of said gas outlet tube, and said perpendicularly disposing baffle providing means communicating the outer annular chamber with said liquid collection chamber.

4. Apparatus according to claim 3, characterized by coalescing material substantially filling said outer annular chamber.

5. Apparatus according to claim 4, wherein said cylindrical baffle terminates short of said perpendicularly disposing baffle to define an opening intercommunicating said outer and inner annular chambers and further characterized in that said perpendicularly disposing baffle has peripheral cutout portions therein communicating said outer annular chamber with said liquid collection chamber, said coalescing material extending throughout said outer annular chamber to said perpendicularly disposing baffle.

6. Apparatus according to claim 5, wherein said cylindrical baffle projects toward the said one end of said housing to a partly overlapping relation to said laterally disposing inlet, a projecting end thereof tapering toward the housing axis.

7. Apparatus for separating and removing liquid from a flowing stream of gaseous fluid, including a generally closed cylindrical housing having a liquid outlet at each end thereof, laterally disposing inlet means intermediate the ends of the housing for admitting the flowing stream of gaseous fluid thereto, said inlet means disposing to introduce the flowing stream tangentially of the internal wall of the housing, said internal wall forming a conical separation chamber between said inlet means and said one end of the housing, the apex of said separation chamber being open and forming the liquid outlet at said one end of the housing, a gas outlet tube having an inner end terminating within said housing opposite the liquid outlet in said one end and extending at an outer end to and through the other end of said housing, said inlet means disposing in such relation to the base end of said separation chamber whereby a part of the inflowing stream of gaseous fluid enters into said separation chamber for helical flow therethrough with liquid separating therefrom and discharging through the liquid outlet in the apex of said chamber while the gas in said part establishes a flow path in a reverse direction to and through the inner end of said gas outlet tube, another tube positioned intermediate said gas outlet tube and said internal wall and defining therewith respective inner and outer annular chambers, a baffle disposing perpendicularly of the housing axis in surrounding sealed relation to said gas outlet tube longitudinally spaced from the inner end thereof and forming with the other end of the housing a liquid collection chamber with which the liquid outlet at said other end of the housing communicates, means providing for direct substantially straight line flow from said outer annular chamber past said baffle and into said collection chamber, other means providing for substantially right angle flow out of said outer annular chamber adjacent said baffle into said inner annular chamber, and coalescing material substantially filling said outer annular chamber, a part of the inflowing stream of gaseous fluid which does not enter into said separation chamber flowing oppositely to enter and move through said outer annular chamber toward said baffle, moisture particles in the stream agglomerating in said coalescing material as relatively large droplets and being blown past said baffle into said collection chamber and gas in the stream turning at right angles into said inner annular chamber and flowing reversely therethrough to the inner end of said gas outlet tube.

8. Apparatus according to claim 7, wherein said other tube disposes in concentric surrounding relation to said gas outlet tube and projects relatively thereto beyond the inner end of said gas outlet tube substantially to said laterally disposing inlet, a projecting end of said other tube tapering toward the housing axis to facilitate entrance of a part of the inflowing stream of gaseous fluid into said outer annular chamber.

* * * * *